United States Patent [19]

Buchberger et al.

[11] Patent Number: 4,747,125
[45] Date of Patent: May 24, 1988

[54] PROGRAMMED CONVERSATION RECORDING SYSTEM WITH VARIABLE PATIENCE INTERVAL

[76] Inventors: Gregory D. Buchberger, 500 Huntington Commons Rd., Mt. Prospect, Ill. 40200; Peter F. Theis, 3203 Bay View La., McHenry, Ill. 60050

[21] Appl. No.: 937,047

[22] Filed: Dec. 2, 1986

[51] Int. Cl.$^4$ ............................................. H04M 11/10
[52] U.S. Cl. ........................................ 379/67; 379/80; 369/50; 434/321
[58] Field of Search ............. 379/67, 69, 72, 80, 379/81, 84, 88, 89, 92; 369/50; 434/319, 320, 321

[56] References Cited

U.S. PATENT DOCUMENTS 3,550,289 12/1970 Orita et al. ........................... 434/320
3,747,228 7/1973 Yamamoto ........................ 434/321 X
4,079,200 3/1978 Meri ...................................... 379/80
4,539,436 9/1985 Theis ................................. 379/92 X
4,692,817 9/1987 Theis ................................. 379/80 X Primary Examiner—Keith E. George
Attorney, Agent, or Firm—Willian Brinks Olds Hofer Gilson & Lione Ltd.

[57] ABSTRACT

A programmed conversation recording system presents a caller with a sequence of messages and records caller responses to these messages during respective calling periods. According to this invention, pauses in the caller response are automatically detected and timed and a patience interval is provided which varies in real time during the recording period as a function of the duration of the caller response. The recording period is automatically terminated when the duration of a pause in the caller response exceeds the patience interval. By varying the patience interval in real time during the recording period, the recording system can be programmed to respond properly, even to responses to complex questions.

17 Claims, 3 Drawing Sheets

PROGRAMMED CONVERSATION RECORDING SYSTEM WITH VARIABLE PATIENCE INTERVAL

BACKGROUND OF THE INVENTION

The present invention relates to programmed conversation recording systems, and in particular to improvements to such systems which allow the programmed conversation to proceed as fluently as possible.

Theis U.S. Pat. No. 4,539,436 discloses a recording system which conducts a programmed conversation with a caller by presenting the caller with a series of prerecorded messages or prompts and recording caller responses to these messages. The Theis system monitors the caller's response for pauses and times the duration of these pauses. The pause duration is compared with a preset threshold value, and the system automatically proceeds to the next prerecorded message when the duration of a pause exceeds this predetermined threshold. In this way, the next prerecorded message follows the completion of the caller's response to the preceding message in a natural way.

In the system disclosed in the Theis patent, the pause threshold is a predetermined value which remains constant for an entire response. In the preferred embodiment described in the Theis patent this pause threshold is set equal to either two seconds or six seconds, as programmed for each separate response. For example, in a programmed conversation that includes five caller responses, the Theis system can set the pause threshold for caller responses 1, 2 and 5 at two seconds, and the pause threshold for caller responses 3 and 4 at six seconds. When the duration of any pause in a caller response exceeds the respective threshold value, the system automatically terminates the recording of the caller response and proceeds to the presentation of the next prerecorded message. The use of such a fixed threshold works quite well for questions which have predictable answers. However, more complex questions pose a more complex problem.

It is important to handle a question-and-answer sequence between a caller and a recording system in as fluent a manner as possible. It is of primary importance that the programmed conversation be strictly formatted, so that there is a minimal chance of the caller becoming confused by expecting the recording system to answer the caller's questions. Such confusion can be caused when the recording system does not proceed with the dialog as the caller expects. For example, if the caller's response to the question "Is there anything else?" is a simple "No", the caller will typically expect a prompt response, such as another question. Conversely, the caller's answer to this question may involve a long description of the caller's request, during which he should not be interrupted. A recording system which uses a fixed, predetermined threshold for each caller response must be programmed to compromise between the thresholds appropriate for such simple and complex responses, thereby not handling either in a natural manner.

SUMMARY OF THE INVENTION

The present invention is directed to an improvement in such programmed conversation recording systems which automatically varies the pause threshold during the recording period as a function of the duration of the caller response.

According to this invention, a response recording system of the type comprising means for presenting a caller with at least one message and means for recording a caller response to this message during a recording period is provided with means for automatically detecting a pause in the caller response, means for providing a patience interval which varies during the recording period as a function of the duration of the response, and means for automatically terminating the recording period when the duration of the pause exceeds the patience interval.

Because the patience interval is varied during the caller response on a real time basis in accordance with the length of the caller response, the programmed conversation can proceed in a more fluent manner. For example, with the present invention the patience interval used for the caller response to the question "Is there anything else?" may increase in duration during the caller response. In this way, a relatively short patience interval will be provided at the beginning of the caller response, followed by an increasingly longer patience interval as the response goes on. Conversely, some prerecorded messages will require a strictly informational answer of the caller of predictable length, although the caller may occasionally ramble on, deviating from the essential formatted dialog, wasting time and opening the way for confusion. An appropriate patience interval for this situation is one in which the patience interval decreases during the course of the caller response. In this way, the caller is allowed ample time to provide the information requested by the previous prerecorded message, but the progressively decreasing patience interval makes it progressively difficult to complete further comments. In addition, there may be situations where a question requires either a short or a longer but fairly predictable answer. In this case, the patience interval may be set at a short value initially, lengthening to a maximum probable answer length, and then progressively shortening thereafter. Similarly, a patience interval may begin at a relatively long value, decrease to a certain minimum value and then increase again.

By altering the patience interval in real time during the response of the caller, the recording system of this invention reduces the likelihood that a caller will become confused, and increases the prospect of successfully completing the programmed conversation.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
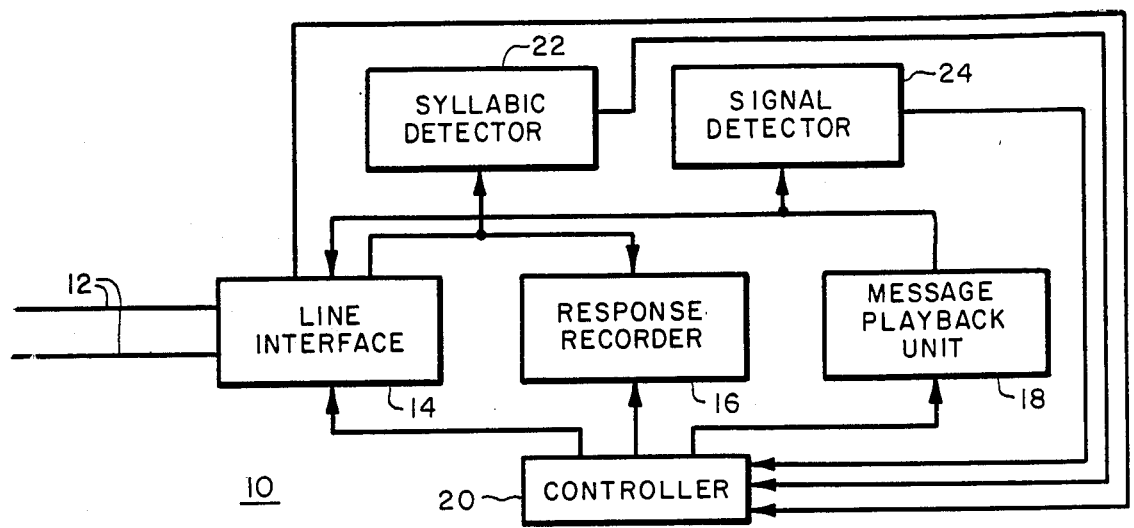
FIG. 1 is a schematic representation of a programmed conversation recording system which incorporates a presently preferred embodiment of this invention.

Turning now to the drawings, FIG. 1 shows a schematic view of a programmed conversation recording system 10 which incorporates a presently preferred embodiment of this invention. This recording system 10 includes a telephone line interface 14 which is connected to a telephone line 12. This line interface 14 is a conventional system for automatically answering a call on the telephone line 12 in response to a ring signal.

The line interface 14 is connected to a response recorder 16 and a message playback unit 18. The response recorder 16 records caller responses to questions presented to the caller by the message playback unit 18. Thus, the message playback unit 18 presents prerecorded audio messages via the line interface 14 to the telephone line 12, and the response recorder 16 records audio messages via the line interface 14 from the telephone line 12.

A controller 20, which in this embodiment comprises a programmed microprocessor, is coupled to the line interface 14 to receive information that identifies to the controller 20 that a call has been answered on the telephone lines 12. In addition, the controller 20 can command the line interface 14 to terminate the connection. The controller 20 is also coupled to the response recorder 16 to allow the controller 20 to start and stop the recorder such that the recorder runs only when the controller 20 is in an incoming mode, operating to record a caller response. The controller 20 also controls operation of the message playback unit 18 such that when the controller 20 is in an outgoing mode the controller 20 causes specific messages to be played to the caller on the line 12. Each of the messages stored in the message playback unit 18 comprises a recorded signal such as a tone at the end of the message, and a signal detector 24 is provided to detect these recorded signals. The controller 20 monitors the output of the detector 24 in order to determine the end of each of the messages during playback.

A syllabic detector 22 is connected to monitor caller responses transmitted from the line interface 14 to the response recorder 16. The syllabic detector 22 generates an output signal which is applied as an input to the controller 20. This output signal is in a first logic state during time periods when the syllabic detector 22 recognizes the presence of voice in the caller response, and a second logic state during time periods characterized by an absence of voice in the caller response. Typically, such an absence of voice corresponds to a pause in the caller response.

Figure 2:
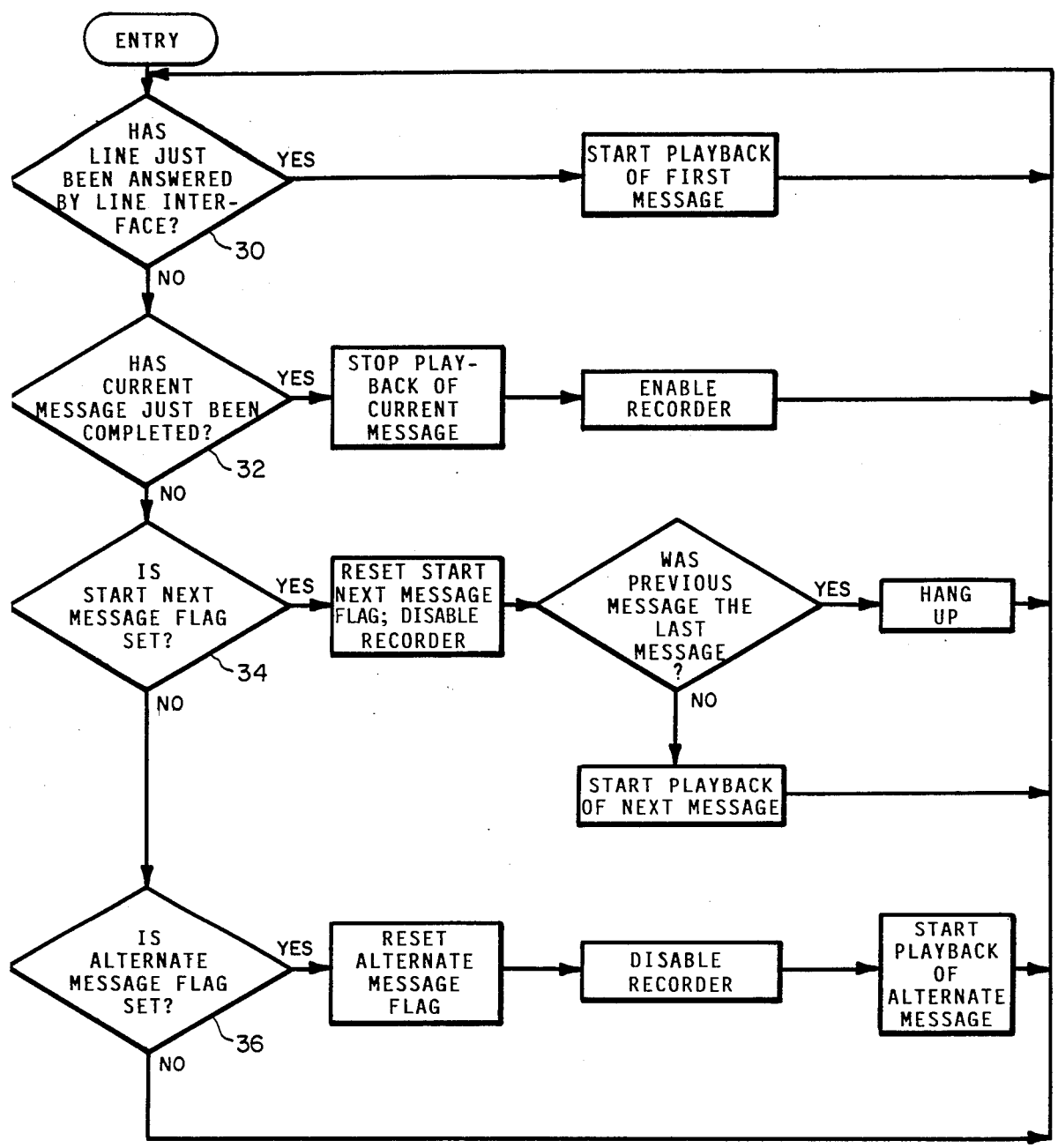
FIG. 2 is a flow chart which clarifies the operation of the controller of FIG. 1.

FIG. 2 is a generalized flow chart which illustrates the standard mode of operation of the controller 20 of the programmed conversation recording system 10. This loop includes four major decision diamonds 30-36 which are executed repeatedly in sequence. In the first decision diamond 30 the controller checks to determine whether the telephone line 12 has just been answered by the line interface 14. If so, the controller 20 causes the message playback unit 18 to start playback of the first prerecorded message in the programmed conversation.

In the second decision diamond 32, the controller 20 checks to determine whether playback of the current message has just been completed. This is accomplished by monitoring the output of the signal detector 24 for the recorded signal characteristic of the end of a prerecorded message. If a current message has just been completed, the controller 20 stops the message playback unit 18 and enables the response recorder 16 in order to record the caller response to the completed message from the playback unit 18.

In decision diamond 34, the controller 20 checks to determine whether the Start Next Message Flag has been set by the program of FIG. 3 described in detail below. This flag indicates completion of a caller response. If it has been set, the controller 20 resets the Start Next Message Flag and disables the response recorder 16. The controller 20 then checks to determine whether the previous message was the last message. If so, the controller 22 causes the line interface 14 to hang up the telephone line 12. Otherwise, the controller 20 starts the message playback unit 18 to start playback of the next message.

In decision diamond 36, the controller 20 checks to determine whether the Alternate Message Flag has been set by the program of FIG. 3 described in detail below. If so, the controller 20 resets the Alternate Message Flag, disables the recorder 16, and starts playback of an alternate message on the message playback unit 18.

Figure 3:
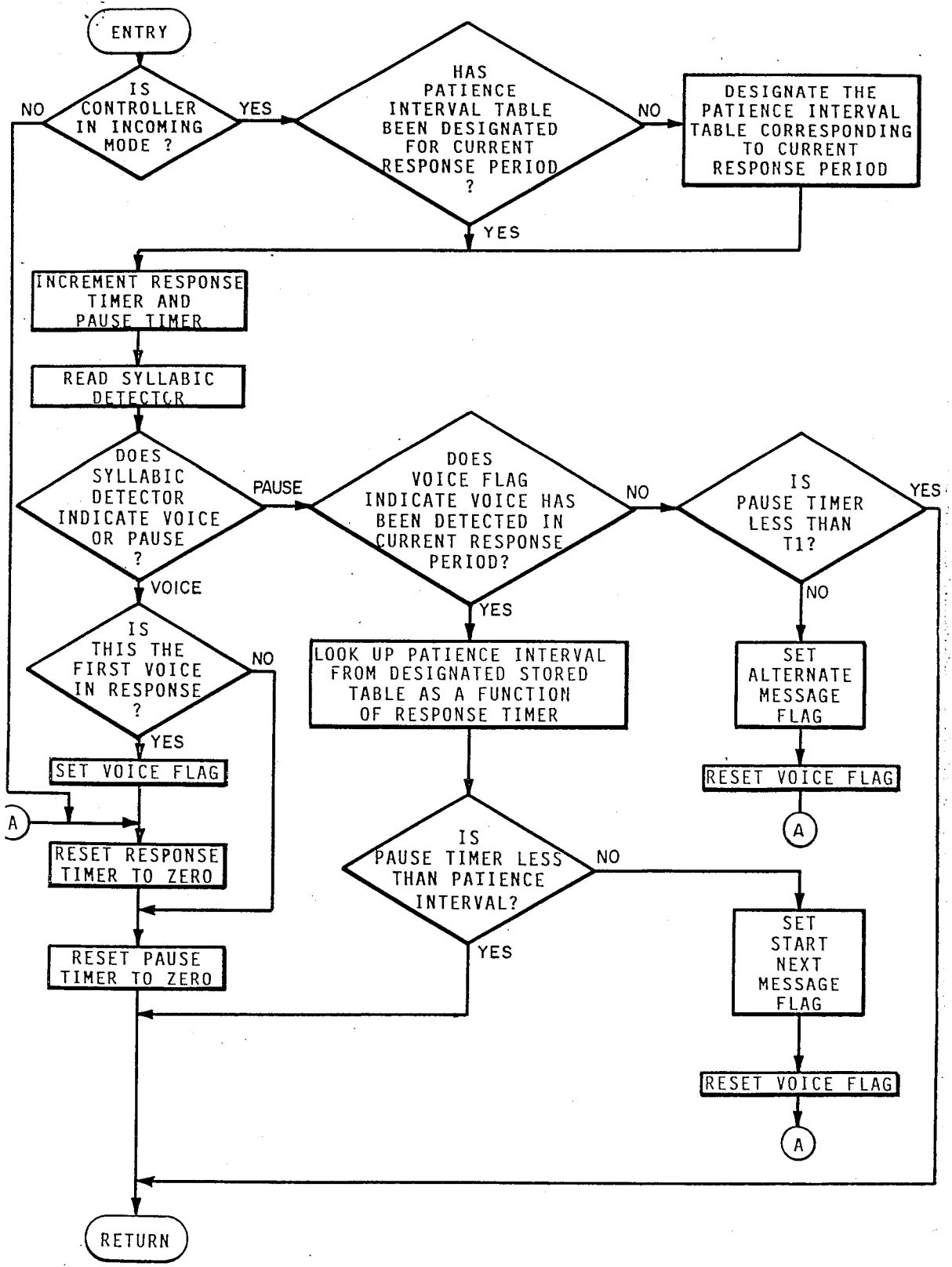
FIG. 3 is a flow chart providing further details of operation of the controller of FIG. 1.

FIG. 3 is a flow chart showing how the controller 20 sets the Start Next Message Flag and the Alternate Message Flag referenced in FIG. 2. The program of FIG. 3 is executed on a periodic basis, as for example once every tenth of a second.

Upon entry, the program of FIG. 3 checks to determine whether the controller is in the incoming mode, ready to record a caller's response. If not, the program resets a response timer and a pause timer to zero and returns. The response timer is used to time the duration of the caller response, and the pause timer to time the duration of individual pauses within the caller response.

On the other hand, if the controller is in the incoming mode, indicating that a caller response is being recorded, the program of FIG. 3 designates one of a plurality of the stored patience interval tables for this response, if this has not already been done. In alternate embodiments, the recorded signal at the end of each recorded message can be used to encode the identity of the appropriate stored table, or the controller 20 can store a list that identifies the appropriate patience interval table for each of the recorded messages. The program of FIG. 3 then increments the response timer and the pause timer and reads the output signal generated by the syllabic detector 22. As explained above, this output signal indicates whether the caller response is characterized by voice or absence of voice. The program branches depending upon the comparison.

In the event the output of the syllabic detector 22 indicates voice in the caller response, the program then checks to determine whether this is the first detected voice of the particular caller response. If so, a voice flag is set and the response timer is reset to zero. Whether or not this is the first detected voice in the caller response the pause timer is reset to zero and the program returns.

In the event the syllabic detector 22 indicates a pause in the caller response, the program then checks the voice flag to determine whether the caller has begun to respond to the preceding message. If not, the pause timer is compared with a predetermined threshold value T1, which can for example be equal to 10 seconds. If the pause preceding the start of the caller response is less than T1, the program returns. Otherwise, the Alternate Message Flag is set, the voice flag is reset, the response and pause timers are reset to zero, and the program returns. Thus, the Alternate Message Flag is only set when a caller fails to begin a response to a prerecorded message within the time period T1.

In the event the syllabic detector 22 indicates a pause in the caller response, and the voice flag indicates that the caller has previously begun to respond (indicating that the current pause is embedded within the caller response), the program then looks up a patience interval from the designated table of patience intervals as a function of the response timer. In this embodiment, the response timer contents are used as a pointer to retrieve a corresponding patience interval from the designated stored table of patience intervals. In this description, the term "patience interval" is used to signify a threshold value which varies in real time during the caller response.

The time interval stored in the pause timer is then compared with the retrieved patience interval. If the pause timer is less than the retrieved patience interval, the program returns. Otherwise, the program sets the Start Next Message Flag, resets the voice flag, resets the response and pause timers, and then returns. Thus, the Start Next Message Flag is only set when a pause longer than the retrieved patience interval is detected within a caller response.

As pointed out above in connection with FIG. 2, when the Start Next Message Flag is set by the program of FIG. 3, the response recorder 16 is stopped and playback of the next message is initiated if the last message has not already been played back. In the event the caller does not respond to a prerecorded message within the period T1, the program of FIG. 2 stops the recorder 16 and starts playback of an alternate message advising the caller that the conversation has not been completed and the call is being terminated.

Figure 4A:
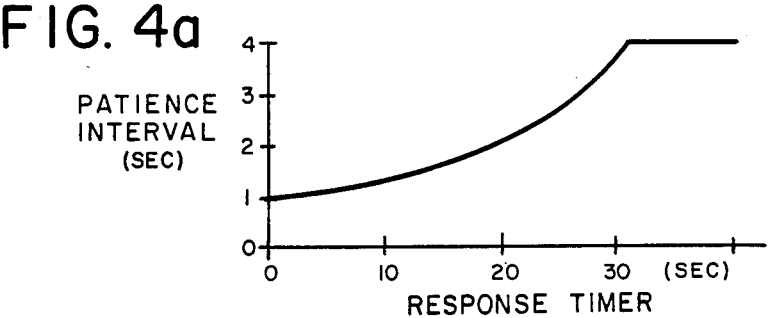
FIGS. 4a, 4b, and 4c are graphs showing the variation of patience interval with response time for three separate responses.
Figure 4B:
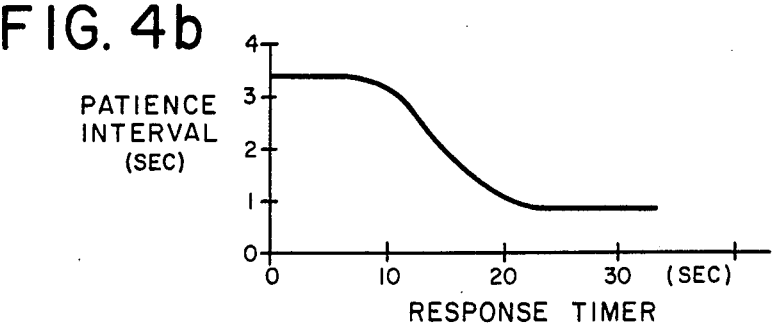
Figure 4C:
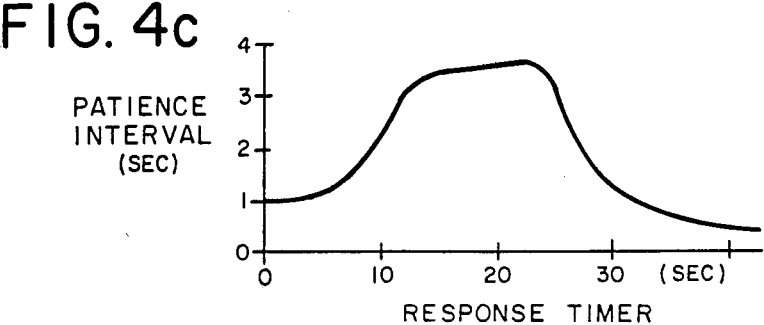

As explained above, the optimum patience interval will vary from response to response, depending upon the nature and complexity of the response prompted by the preceding prerecorded message. FIGS. 4a–4c graphically depict three types of patience intervals that can be used. The patience interval of FIG. 4a starts at the beginning of a caller response at a relatively low value and increases progressively during the opening seconds of the caller response to a higher value. Conversely, the patience interval of FIG. 4b starts at a relatively high value at the start of a caller response, stays at that relatively high value for the first ten seconds of the caller response, and then decreases to a lower value over the next ten seconds of the caller response.

The patience interval of FIG. 4c starts at a relatively low value at the beginning of a caller response, progressively increases to a higher value for a central portion of the caller response, and then decreases back to an even lower value. From FIGS. 4a–4c it should be apparent that the function which interrelates the response timer and the patience interval can be varied widely, depending upon the anticipated or desired response pattern to the particular prerecorded message.

As pointed out above, the presently preferred embodiment utilizes a table lookup technique to retrieve the patience interval as a function of the response timer. Table 1 shows one illustrative example of a table which can be used to implement the function of FIG. 4a. In Table 1 the patience interval in seconds is stored for each value of the response timer between zero and 35 seconds. The appropriate patience interval can simply be determined by using the value stored in the response timer as a pointer to select the corresponding one of the stored patience intervals.

In the preferred embodiment described above, the line interface 14, response recorder 16, message playback unit 18, syllabic detector 22 and signal detector 24 are all well-known prior art devices which do not form part of this invention. They will not, therefore, be described in greater detail here. They can, for example, be implemented as described in the above-identified Theis U.S. Pat. No. 4,539,436, or as marketed by Conversational Voice Technologies of Gurnee, Ill. as the Con-Mode system. The controller 20 is a programmed microprocessor, and once again, the structure of the microprocessor and the general operational details flowcharted in FIG. 2 do not form part of this invention and have therefore not been described in detail. As pointed out above, this invention is focused on the use of a patience interval which varies in real time during the caller response, and FIGS. 3, 4a–4c and Table 1 describe the presently preferred embodiment of the invention.

Of course, it should be understood that a wide range of changes and modifications can be made to the preferred embodiment described above. For example, the present invention can readily be implemented in either digital or analog systems. It is not essential in all embodiments that a stored table of patience intervals be used. Rather, the patience interval appropriate for any particular point in the caller's response can be determined in other ways, utilizing either hardware or software techniques. For example, a starting patience interval and a rate of increase or decrease can be specified. Furthermore, this invention is not limited to recording systems intended for use with telephone lines. Rather, the present invention is well suited for use in applications in which the recording system is hard wired to the caller station. In this specification, the following claims the term "caller" is intended in its broad sense, and is not intended to be limited to telephone callers. In the embodiment described above, the response is timed from the instant a caller begins to speak in response to a recorded message. In alternative embodiments, the caller response can be timed beginning with the termination of the preceding recorded message.

It is therefore intended that the foregoing detailed description be regarded as illustrative rather than limiting, and that it be understood that it is the following claims, including all equivalents, which are intended to define the scope of this invention.

TABLE 1

| Response Timer (Sec.) | Patience Interval (Sec.) |
|---|---|
| 0 | 1.0 |
| 1 | 1.0 |
| 2 | 1.1 |
| 3 | 1.1 |
| 4 | 1.2 |
| 5 | 1.2 |
| 6 | 1.3 |
| 7 | 1.3 |
| 8 | 1.4 |
| 9 | 1.4 |
| 10 | 1.5 |
| 11 | 1.6 |
| 12 | 1.7 |
| 13 | 1.8 |
| 14 | 1.9 |
| 15 | 2.0 |
| 16 | 2.1 |
| 17 | 2.2 |
| 18 | 2.3 |
| 19 | 2.4 |
| 20 | 2.5 |
| 21 | 2.6 |
| 22 | 2.8 |
| 23 | 3.0 |

TABLE 1-continued

| Response Timer (Sec.) | Patience Interval (Sec.) |
| --- | --- |
| 24 | 3.2 |
| 25 | 3.4 |
| 26 | 3.7 |
| 27 | 4.0 |
| 28 | 4.0 |
| 29 | 4.0 |
| 30 | 4.0 |
| 31 | 4.0 |
| 32 | 4.0 |
| 33 | 4.0 |
| 34 | 4.0 |
| 35 | 4.0 |

We claim:

1. In a response recording system of the type comprising means for automatically presenting a caller with at least one message and means for automatically recording a caller response to said at least one message during a recording period, the improvement comprising:
    means for automatically detecting a pause in the caller response;
    means for providing a patience interval which varies during the recording period as a function of the duration of the caller response; and
    means for automatically terminating the recording period when the duration of the pause exceeds the patience interval.

2. The invention of claim 1 wherein the pause detecting means comprises a syllabic detector.

3. The invention of claim 1 wherein the patience interval providing means comprises:
    means for storing a list of patience intervals; and
    means for selecting one of the stored list of patience intervals in accordance with the duration of the caller response.

4. The invention of claim 1 wherein the response recording system includes means for automatically presenting the caller with a second message after the recording period has been terminated by the terminating means; and means for automatically recording a caller response to the second message.

5. The invention of claim 1 wherein the response recording system is adapted for connection to a telephone line to receive the caller response via the telephone line.

6. The invention of claim 1 wherein the patience interval increases in magnitude with increasing response duration in a selected range of response duration.

7. The invention of claim 1 wherein the patience interval decreases in magnitude with increasing response duration in a selected range of response duration.

8. The invention of claim 1 wherein the patience interval increases and then decreases in magnitude with increasing response duration in a selected range of response duration.

9. In a response recording system of the type comprising first means for automatically presenting a caller with a plurality of messages and second means for automatically recording caller responses to at least selected ones of the messages during respective recording periods, the improvement comprising:
    means for automatically detecting a pause in one of the caller responses;
    means, responsive to the detecting means, for generating a first signal indicative of the duration of the pause;
    means for generating a second signal indicative of the duration of the caller response;
    means for storing at least one sequence of patience intervals, each sequence corresponding to at least one of the messages, and each patience interval corresponding to a respective response duration;
    means for using the second signal to select the corresponding patience interval such that the selected patience interval varies during the recording period; and
    means for automatically causing the first means to present a next one of the messages to the caller when the first signal exceeds the selected patience interval.

10. The invention of claim 9 wherein the response recording system is adapted to receive caller responses via a telephone line.

11. The invention of claim 9 wherein the patience intervals in at least one sequence of the patience intervals increase in magnitude with increasing response duration.

12. The invention of claim 9 wherein the patience intervals in at least one sequence of the patience intervals decrease in magnitude with increasing response duration.

13. The invention of claim 9 wherein the patience intervals in at least one sequence of the patience intervals increase and then decrease in magnitude with increasing response duration.

14. The invention of claim 9 wherein the storing means stores a plurality of sequences of patience intervals, and wherein the invention further comprises means for designating a corresponding one of the sequences of patience intervals for each respective one of the caller responses.

15. In a response recording system of the type comprising first means for automatically presenting a caller with a plurality of messages and second means for automatically recording caller responses to at least selected ones of the messages during respective recording periods, the improvement comprising:
    means for automatically detecting a pause in the caller responses;
    means for providing a plurality of patience intervals, each varying during a called response as a separate respective function of the duration of the caller response, each patience interval associated with at least one of the caller responses;
    means for designating the associated one of the patience intervals for each of the caller responses; and
    means for automatically terminating the respective recording period when the duration of the pause exceeds the designated patience interval.

16. The invention of claim 15 wherein the pause detecting means comprises a syllabic detector.

17. The invention of claim 15 wherein the response recording system is adapted for connection to a telephone line to receive the caller response via the telephone line.

* * * * *

UNITED STATES PATENT AND TRADEMARK OFFICE
CERTIFICATE OF CORRECTION

PATENT NO. : 4,747,125

DATED : May 24, 1988

INVENTOR(S) : Gregory D. Buchberger et al.

It is certified that error appears in the above-identified patent and that said Letters Patent is hereby corrected as shown below:

IN THE CLAIMS

In column 8, line 50, please delete "called" and substitute therefor --caller--.

Signed and Sealed this

Fifteenth Day of January, 1991

Attest:

HARRY F. MANBECK, JR.

*Attesting Officer*   *Commissioner of Patents and Trademarks*